Dec. 12, 1967  L. V. LARSEN  3,357,089
APPARATUS FOR WRAPPING MULTIPLE-LAYER VESSELS
Filed Nov. 20, 1964  3 Sheets-Sheet 1

INVENTOR.
Lyle V. Larsen
By Merriam, Smith & Marshall
ATTORNEYS.

INVENTOR.
Lyle V. Larsen
By Merriam, Smith & Marshall
ATTORNEYS.

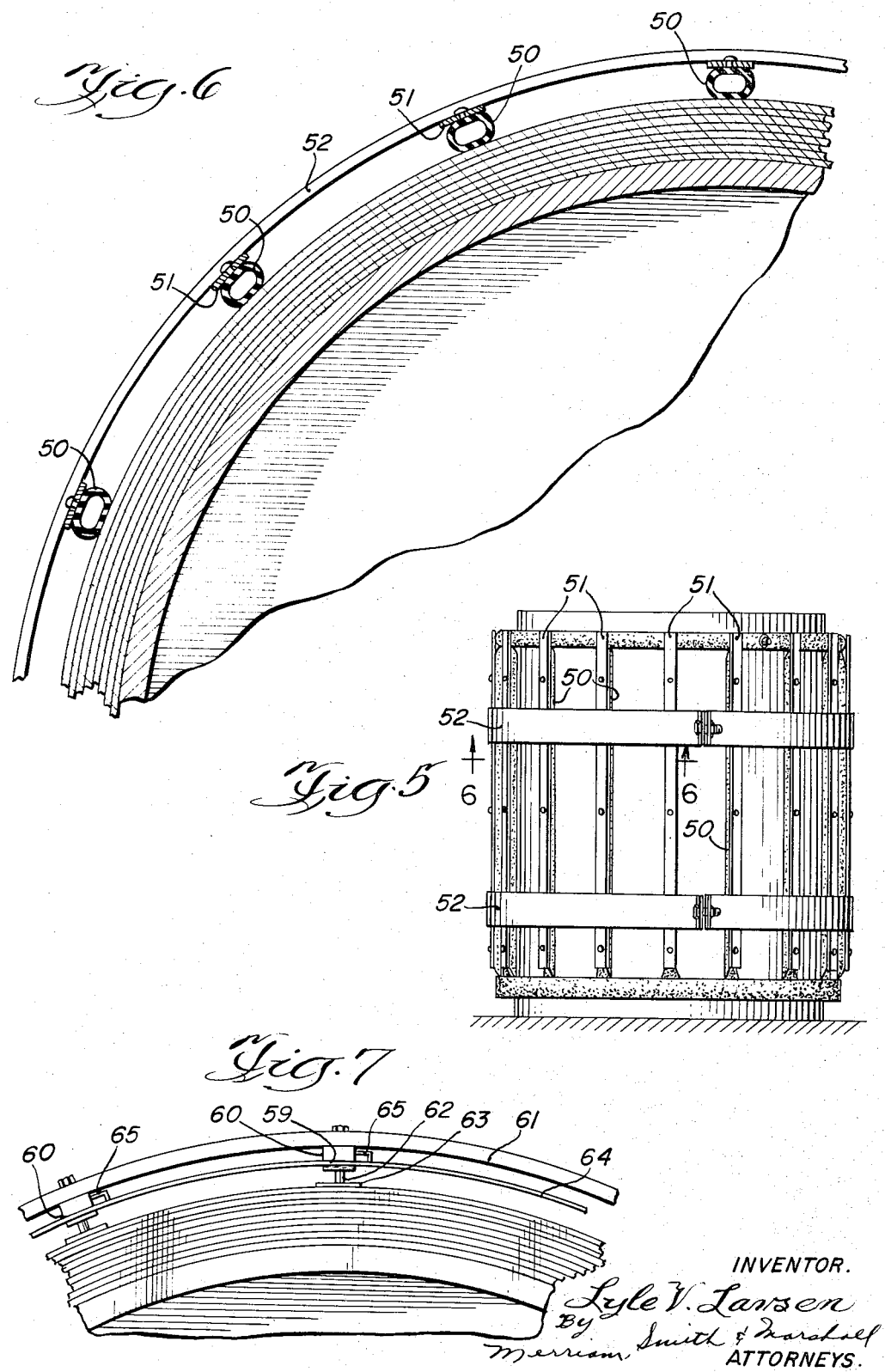

United States Patent Office 3,357,089
Patented Dec. 12, 1967

3,357,089
APPARATUS FOR WRAPPING MULTIPLE-LAYER VESSELS
Lyle Vernon Larsen, Elmhurst, Ill., assignor to Chicago Bridge & Iron Company, Oak Brook, Ill., a corporation of Illinois
Filed Nov. 20, 1964, Ser. No. 412,807
11 Claims. (Cl. 29—446)

This invention relates to apparatus for, and methods of, applying a sheet material layer to a body. More particularly, this invention is concerned with novel apparatus and methods for the production of multiple-layer vessels for commercial uses, especially high pressure uses.

Vessels of a wide variety of forms and structures are used industrially. Many vessels employed are more or less cylindrical in shape with dished or hemispherical end portions. Vessels of such general shape are particularly useful for storing a wide variety of materials, particularly where high pressures are involved. Although the cylindrical walls of such vessels can be made of a single plate, it is advantageous to make the cylindrical walls of such vessels of multiple layers of thin sheet material, such as of metal sheet, because increased strength and fabrication advantages can be obtained.

In making multiple-layer vessels it is necessary to apply each consecutive layer tightly on a supporting surface, such as an inner shell, or to a previously applied outermost layer. The layer being applied must be tightly compressed or pulled around the vessel and maintained tightly against the supporting surface while the layer is attached, as by welding in the case a metal layer is used, to the supporting under surface and/or abutting longitudinal edges of the layer being applied.

The equipment which has been used for applying the required compressing or pulling force has been limited to shop use because of its weight, size and installation complexities. Consequently, the field wrapping of large multiple-layer vessels too large or heavy to ship has not been feasible.

According to the present invention there is provided novel apparatus of such structural design and weight as to be portable and useful for both shop and field construction of multiple-layer vessels. The apparatus can exert suitable compressive forces to tightly press a sheet material layer against a base surface for applying such layer thereto in the construction of multiple-layer vessels or for any other purpose where it is desirable or necessary that this be done. In addition to the novel apparatus provided herewith, there are also provided novel methods of tightly wrapping a layer of sheet material on a body, particularly a tubular or cylindrical body useful for producing a vessel.

According to one aspect of the present invention, there is provided apparatus for tightly wrapping a layer of sheet material on a body comprising expandable fluid pressure applying means that can at least partially overlay a layer of sheet material upon a body, and a backing means, advisably essentially nonstretchable, supporting the fluid pressure means to effect a tighening of the sheet layer against the body as the fluid pressure means is expanded and the backing means resists the forces so developed and directs the same against the layer of sheet material. The backing means, such as a structural band, and the layer being added serve to confine the fluid pressure means, such as a flexible fluid retaining element, so that as fluid under pressure is delivered to the pressure means a tightening force is developed and applied to the layer.

The subject invention also provides the method of tightly wrapping a layer of sheet material on a body which comprises loosely wrapping a layer of sheet material around a body, positioning fluid pressure expandable means in unpressurized condition around the layer on the body, positioning a backing means about the periphery of the fluid pressure means, applying fluid pressure to the fluid pressure expandable means until the same expands and the developed pressure is resisted by the backing means and is directed against the layer forcing it against the body.

The invention will be described further in conjunction with the attached drawings in which:

FIGURE 5 is a plan view of a cylindrical body having axially positioned spaced apart tubes with backing means positioned around the body;

FIGURE 6 is a partial sectional view of FIGURE 5 at the line 6—6; and

FIGURE 7 is an elevation of a cylindrical body showing piston means for applying pressure to the surface of a layer being wrapped on the body.

In each of the views of the drawings forming part of this application, the same numbers will be used to designate identical or similar parts.

Figure 1:
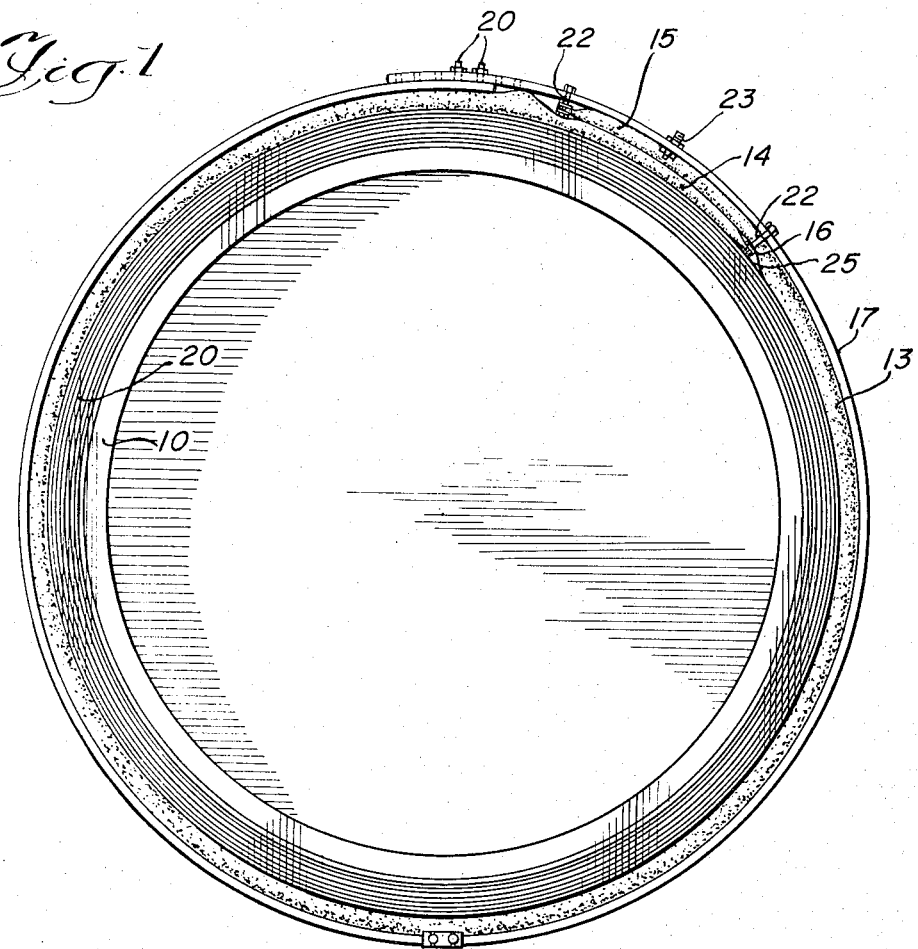
FIGURE 1 is a vertical sectional view through a cylindrical vessel being fabricated out of multiple layers of sheet material.

In FIGURE 1 there is shown a body portion 10 which in the drawing is a right cylinder of suitable material. Most often the body is of metal such as steel or aluminum, although it can be of other appropriate material. The body 10 serves as the supporting base about which a consecutive series of sheet material layers is applied one over the other in tight sandwich-like construction. The cylindrical body 10 of FIGURE 1 is shown to have a plurality of sheet material layers 12 tightly pressed around the supporting body to produce the multiple-layer vessel construction. Each of the multiple layers can be tightly pressed in place one at a time by using the novel apparatus of this invention.

The liquid pressure means of FIGURE 1 comprises an elongated hollow tube 13, advisably made of a flexible resilient material. For the purpose of this invention the fluid pressure means 13 can be formed from a high pressure hose such as of about 4 to 6 inches diameter. The liquid pressure tube means 13 is advisably of sufficient length to encircle the vessel being wrapped by the sheet material. As shown in FIGURE 1, the hollow tube 13 is positioned to have the ends thereof overlap each other. Thus, one end portion 14 of the hollow tube is overlapped by the other end portion 15. It is not essential that the end portions so overlap each other since the end portions can be positioned side-by-side and the advantages of the invention obtained equally as well.

Figure 3:
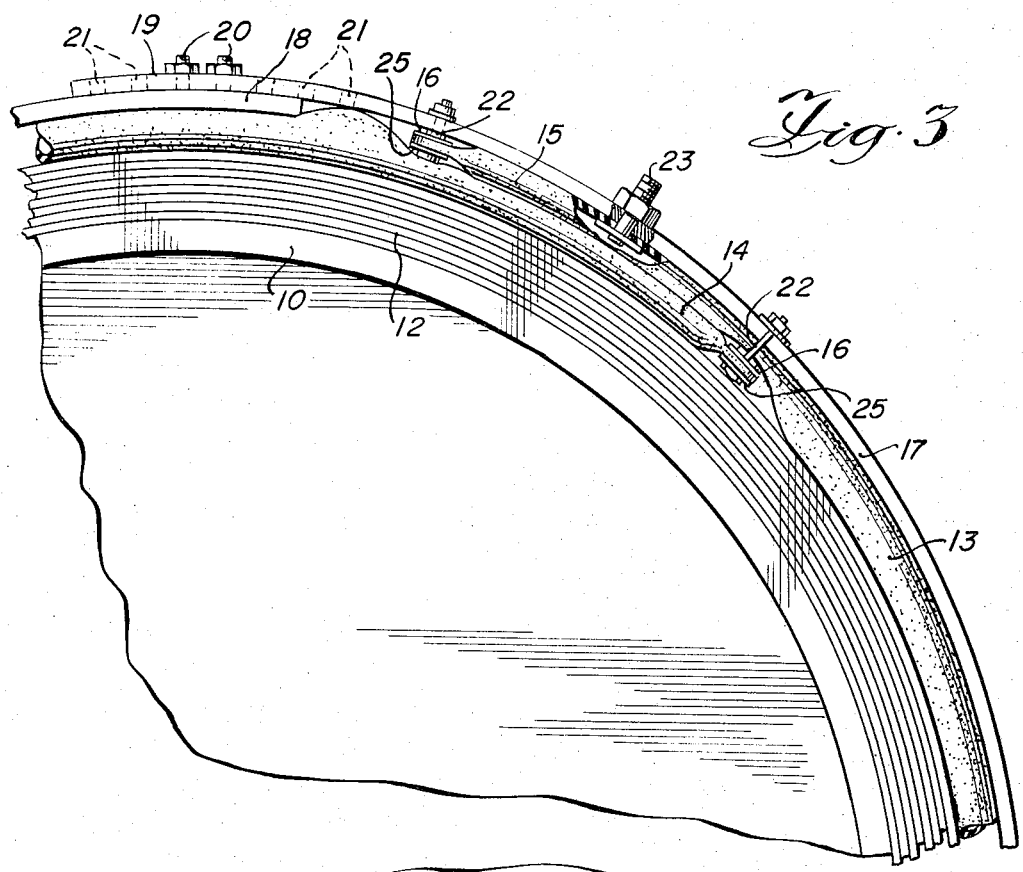
FIGURE 3 is an enlarged view of the fluid pressure means and backing means shown in FIGURE 1.

The ends of the tube 13 are pressed tightly closed by placing pieces of metal on opposite sides of the tube and forcing the lips together. Thus, with reference to FIGURE 3 the end 14 is closed by metal plates 25 and 16 which are positioned on each side of the tube mouth and pressed together and held tightly in place by appropriate means such as bolts. Similar structure can be used to seal end 15 of the tube.

There is placed circumferentially around the periphery of hollow tube liquid pressure means 13 a backing means, advisably of adjustable length, which restricts the fluid pressure means against outward radial movement when the liquid pressure is increased. By resisting outward pressure the forces developed by increasing the fluid pressure in the tube 13 are thereby directed inwardly against the sheet material layer which is thus tightly pressed against the surface therebeneath. The backing means 17 can be made of any suitable material although in this instance it is metal.

The length of the backing means is sufficient to go completely around the vessel and the liquid pressure means as well. As shown in the drawings, the backing means 17 is placed in direct contact with the outer periphery or side of the tube 13. The end portions 18 and 19 of the backing means, which are metal strips of appropriate widths, are secured in place by bolts 20 although other suitable fastening means can be used which will hold the ends in fixed position and yet permit adjustment to accommodate the increased wall thickness as the vessel is fabricated or to accommodate different sized vessels. Bolt holes 21 permit the ends 18 and 19 to be moved to increase or decrease the diameter and circumference of the backing means 17.

In order to secure the ends of the tube in place when it is positioned to be pressurized, bracket means 22 at each end thereof are used. Each of these brackets has a bolt which projects from the closed mouth of the tube on each side of the metal strip 17 and in this way it is kept from sliding to one side or the other. Such brackets are not essential since other obvious retaining means can be employed.

In order to apply fluid pressure there is provided valve 23 through which either gas or liquid can be passed into or out of the hollow tube 13. Although the valve 13 is shown to hold the tube and the backing 17 together, it is not essential that the valve be so positioned. The valve could be positioned at any appropriate location on the tube and need not also simultaneously join the tube and backing together.

In practicing the invention, a layer of sheet material is applied loosely wrapped around the supporting body or over the outer layer of previously applied layers. After that the fluid pressure means comprising the tube 13 is wrapped around the loose sheet material layer and then the retaining backing means 17 is positioned around the outside of tube 13. After securing the ends of the backing means 17 together, fluid pressure is applied by valve 23 and the tube 13 thereby caused to expand in all directions. Because of the presence of the backing means 17 outward pressure is restricted and the pressure applied against the wrapping layer is thereby increased so that it is pressed tightly against the surface therebeneath. After being pressed tightly into place the sheet material layer is fixed in place. When the layer is metal the abutting edges are welded to each other or to the supporting under surface. During the bonding operation, the apparatus is held in place.

Figure 2:
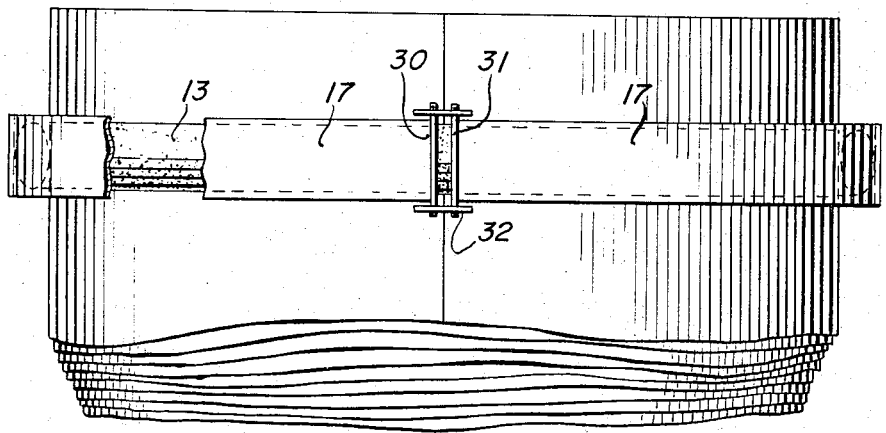
FIGURE 2 is a plan view broken away of one end of the cylindrical body shown in FIGURE 1.
Figure 4:
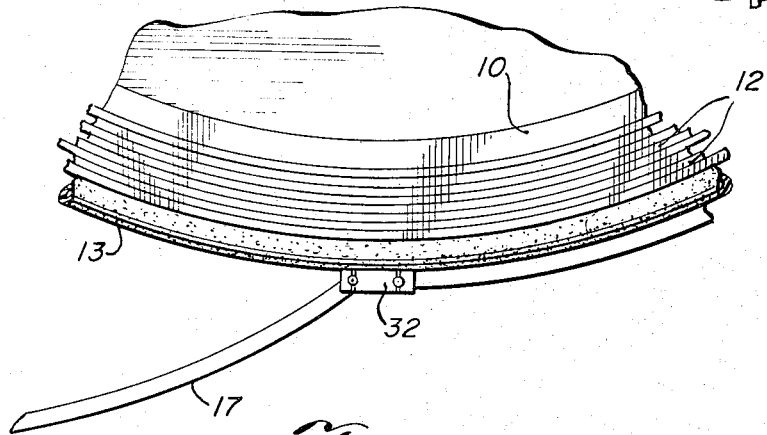
FIGURE 4 is an enlarged view of the hinge mechanism in the backing strip shown in FIGURE 1.

The backing means 17 is preformed or shaped to about the contour of the vessel on which it will be employed. Furthermore, in order to facilitate positioning the backing means about the vessel and its subsequent removal therefrom the backing means can be made of two or more sections. Thus, with reference to FIGURES 2 and 4, the backing means is made of two sections hinged together by pins 30 and 31 supported in bracket plates 32. The ends of the backing means can be joined to the pins 30 and 31 such as by welding.

Although the fluid pressure applying means 13 is illustrated as being one continuous tube, a plurality of such tubes shorter than the circumference may be positioned circumferentially about the vessel in end-to-end position and connected by manifold means so that the pressure in each segment could be maintained equal.

As shown in FIGURES 5 and 6 of the drawings, it is also a part of this invention to position expandable fluid pressure means, such as tubes 50, axially to the cylindrical body in spaced apart relationship around the vessel and to also utilize backing means 51 on the outside of the so-positioned tubes with the additional utilization of one or more circumferentially arranged bands 52 placed around the entire assembly so that upon increasing the pressure in the tubes, the force applied to the adjustable and removable backing means 51 on the tubes will be restrained by the circumferentially positioned bands to thereby cause pressure to be applied inwardly against a layer of sheet material being wrapped on the vessel. The tubes can be individually pressurized or they can be connected to a manifold system for pressure regulation from one location.

In addition to a metal strip 17 as in FIGURE 1, or 52 as in FIGURE 6, one can use other suitable means for backing the liquid pressure means, such as a flat braided cable or a metal belt of link-type construction.

It is also within the scope of the subject invention to use alternative fluid pressure applying means in place of the tube 13 in FIGURE 1 or 50 in FIGURE 5. Thus, it is entirely feasible, as shown in FIGURE 7, to utilize a series of fluid pressure cylinders 60, operated by pressurized liquid or gas, and carried by a backing strip or tension applying means 61. The cylinders contain a suitable piston with projecting arm 62 having a plate 63 at the end which contacts and presses against the layer being wrapped on the vessel. Manifold lines 64 and 65 feed gas or liquid under pressure to and from the cylinder thereby activating the pistons 59. The cylinders can be positioned radially to press against the sheet material layer being applied to the vessel when pressure is increased in the cylinders.

The number of pressure applying means used to secure any layer in place will depend on the size of the layer and its thickness. Because of the simplicity of the apparatus even for a plurality of such tightening means the cost is low.

Various changes and modifications of the invention can be made and, to the extent that such variations incorporate the spirit of this invention, they are intended to be included within the scope of the appended claims.

What is claimed is:

1. Apparatus for tightly wrapping a layer of sheet metal on a tubular metal body, comprising expandable fluid-pressure applying means to be placed about a tubular body and that can at least partially overlay a metal sheet layer wrapped around the outside of the body, and a body-encircling essentially nonstretchable metal backing means for wrapping around the body and supporting the fluid-pressure means to effect a tightening of the sheet layer against the body as the fluid-pressure means is expanded and the backing means resists the forces so developed and directs the same against the layer of sheet metal.

2. Apparatus according to claim 1 in which the metal body is cylindrical and the metal backing means is formed concentrically to the outside contour of the body.

3. Apparatus for tightly wrapping a layer of sheet metal on a cylindrical body in the production of a multiple-layer vessel, comprising an elongated hollow flexible tube expandable by fluid pressure applied therein and of a length to about at least encircle a cylindrical body, said tube having means to apply fluid pressure therein, and an essentially nonstretchable metal backing for wrapping around the tube for restraining the tube under fluid pressure applied therein against outward radial expansion and to direct the forces so developed inwardly to press the layer of sheet metal tightly against the cylindrical body.

4. Apparatus according to claim 3 in which the metal backing is a metal strip wider than the tube diameter.

5. Apparatus according to claim 3 in which the metal backing is a flexible metal strip wider than the tube diameter.

6. Apparatus according to claim 3 in which the metal backing is made of two arcuate sections cooperatively joined to hinge means for positioning the metal backing around said tube and cylindrical body.

7. Apparatus according to claim 3 in which the metal backing is fixably adjustable in substantially circular form through a range of diameters.

8. The method of tightly wrapping a layer of sheet material on a body, which comprises wrapping a layer of sheet material around a body, positioning fluid-pressure expandable means in unpressurized condition around the sheet material and body, positioning an essentially non-stretchable backing means about the periphery of the fluid-pressure means, and expanding such expandable means by fluid pressure into pressure contact with both said sheet material and said backing means.

9. The method of tightly wrapping a layer of sheet metal on a rigid circular cylindrical metal body to make a multiple-layer vessel, which comprises wrapping a layer of sheet metal about a rigid circular cylindrical metal body without overlapping the sheet metal on itself, positioning fluid-pressure expandable means in unpressurized condition around the sheet metal and body, positioning a non-stretchable backing means about the periphery of the fluid-pressure means, and expanding such expandable means by fluid pressure into pressure contact with both said sheet material and said backing means.

10. The method of claim 9 in which the sheet metal layer is secured in place by welding while it is held tightly against the body.

11. The method which comprises wrapping a layer of sheet metal around a rigid circular cylindrical metal body, said metal sheet having a length slightly shorter than the circumference of the body, positioning an elongated hollow flexible tube expandable by fluid pressure applied therein around the body and placing an essentially non-stretchable metal backing strip around the tube about the body to restrain the tube against outward radial movement and expanding such expandable means by fluid pressure into pressure contact with both said sheet material and said backing means.

References Cited
UNITED STATES PATENTS

| | | | |
|---|---|---|---|
| 2,423,862 | 7/1947 | Vorobik | 72—54 |
| 2,480,369 | 8/1949 | Jasper | 29—446 |
| 2,892,253 | 6/1959 | Hutchins et al. | 29—421 |

THOMAS H. EAGER, *Primary Examiner.*